(12) United States Patent
Friesenhahn et al.

(10) Patent No.: US 6,601,544 B2
(45) Date of Patent: Aug. 5, 2003

(54) THERMOSTAT VALVE WITH ELECTRICALLY HEATABLE OPERATING ELEMENT

(75) Inventors: Waldemar Friesenhahn, Kornwestheim (DE); Ulrich Dehnen, Kornwestheim (DE); Barbu Frunzetti, Kornwestheim (DE)

(73) Assignee: Behr Thermot-Tronik GmbH, Kornwestheim (DE)

( * ) Notice: Subject to any disclaimer, the term of this patent is extended or adjusted under 35 U.S.C. 154(b) by 0 days.

(21) Appl. No.: 09/898,985

(22) Filed: Jul. 3, 2001

(65) Prior Publication Data

US 2002/0059906 A1 May 23, 2002

(51) Int. Cl.⁷ .................................................. F01P 7/14
(52) U.S. Cl. .................... 123/41.1; 236/34; 236/101 C
(58) Field of Search ..................... 123/41.1; 236/101 C, 236/34, 34.5

(56) References Cited

U.S. PATENT DOCUMENTS

| 3,640,454 A | 2/1972 | Freisemuth et al. ............ 236/34 |
| 4,666,081 A | * 5/1987 | Cook et al. ................ 236/68 R |
| 5,482,010 A | 1/1996 | Lemberger et al. ......... 123/41.1 |
| 5,799,625 A | 9/1998 | Ziolek et al. .............. 123/41.1 |

FOREIGN PATENT DOCUMENTS

| DE | 1 077 017 | 1/1960 |
| DE | 1 943 484 | 4/1971 |
| DE | 42 33 913 | 4/1994 |
| DE | 196 06 202 | 8/1997 |
| DE | 44 09 547 | 9/1999 |
| DE | 198 44 711 | 3/2000 |
| FR | 2 332 879 | 6/1977 |

* cited by examiner

Primary Examiner—Tony M. Argenbright
Assistant Examiner—Katrina B. Harris
(74) Attorney, Agent, or Firm—Kennedy Covington Lobdell & Hickman, LLP

(57) ABSTRACT

In a thermoset valve for a cooling circuit of an internal combustion engine of the type having a housing (11) containing a thermostatic operating element (10) whose piston (12) actuates a valve element (13), a base plate (17) is affixed to the housing (11) and supports a fixed abutment (25) for a restoring spring (24) which loads the valve element (13).

8 Claims, 3 Drawing Sheets

THERMOSTAT VALVE WITH ELECTRICALLY HEATABLE OPERATING ELEMENT

CROSS REFERENCE TO RELATED APPLICATIONS

This application claims the benefit of German Application 100 32 354.5, filed Jul. 4, 2000, herein incorporated by reference.

FIELD OF THE INVENTION

The present invention relates generally to a thermostat valve for a coolant circuit of an internal combustion engine, and more particularly to such a valve having a stationary housing containing an electrically heatable thermostatic element operating a work piston which, in turn, acts on a valve element, which forms a cage-like surrounding to the housing and has a plate-like valve seat flange sealed with respect to the housing, against the loading force of a restoring spring supported on an abutment.

BACKGROUND OF THE INVENTION

A thermostat valve of the type described above is known from German Patent Publication DE-A 42 33 913. Such a thermostat valve has the advantage that the housing of the thermostatic operating element, into which electrical connections are placed, is arranged to be stationary, so that the electrical connections are not forced to follow movements, and can furthermore be arranged outside of the flowing coolant.

SUMMARY OF THE INVENTION

It is an object of the present invention to further improve the above-described type of thermostat valve in such a way that it is independent to a large extent from the structural arrangement of a housing in which it is installed.

This object is attained by providing a base plate to which the housing of the operating element and the abutment for the restoring spring are attached.

In this manner, the essential elements of the thermostat valve constitute an insert, which internally absorbs the support forces of the housing of the thermostat operating element and of the abutment for the restoring spring, so that no forces of significance are introduced into a housing in which this thermostatic valve is intended to be placed. As a result, substantial freedom results for the structural design of such a housing.

It is furthermore advantageously provided that the base plate has a valve seat assigned to the plate-like flange of the valve housing. In this way, all functional elements are parts of the insert.

In a further aspect of the invention, the base plate is provided with an inner collar, which is connected by means of strips and on which the housing of the thermostatic operating element is maintained. A very compact construction thereby results.

It is provided in a further feature of the invention that the housing is equipped with an annular shoulder, which receives a seal ring, which is assigned to a neck connected with the plate-like flange of the valve element. In this manner, a dependable seal is achieved between the valve element and the housing of the operating element. It is further useful to support the inner collar of the base plate on the annular shoulder of the housing of the thermostatic operating element. This annular shoulder thereby performs a second function in this manner.

It is also provided in a further aspect of the invention that the base plate is fastened on a housing element, which is provided with at least one connector for the coolant circuit and one lead for electrical lines. In this way, the thermostat valve constitutes a connecting element, which can be connected to an engine block or a like mounting without elaborate assembly work being required. In a further arrangement, the end of the housing of the thermostatic operating element facing away from the work piston is inserted into a cap-like guide of the housing element, which is preferably made of plastic. This cap-like guide is used, on the one hand, for holding the thermostatic operating element, and on the other hand, also for the thermal insulation of the thermostatic operating element, in particular against cold coolant, so as to reduce the loss of energy when the thermostatic operating element is heated.

Further characteristics and advantages of the invention ensue from the following description of the embodiment represented in the drawings.

DETAILED DESCRIPTION OF THE PREFERRED EMBODIMENTS

Figure 1:
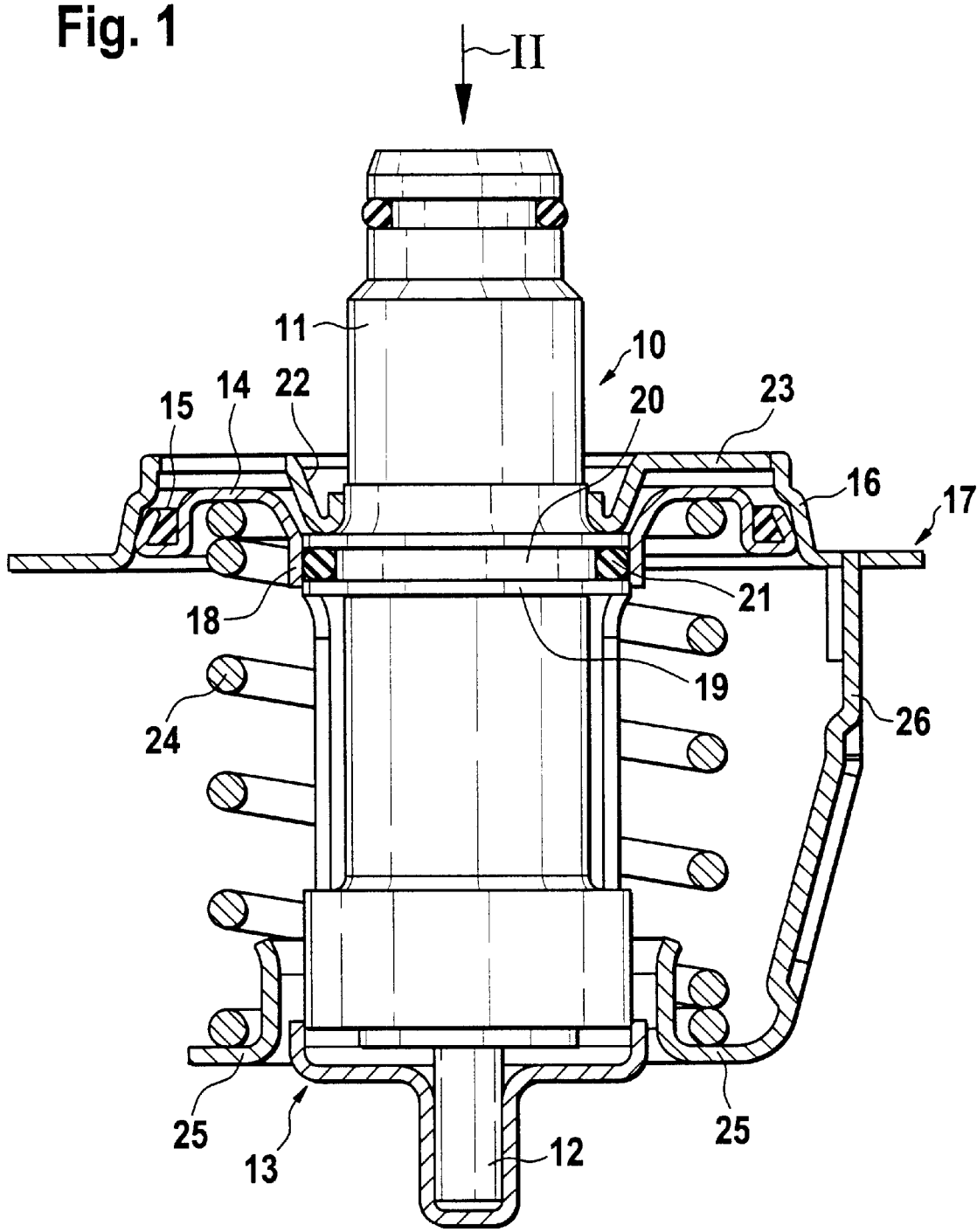
FIG. 1 is a sectional view taken along the line I—I in FIG. 2 through a thermostat valve which is embodied in accordance with the present invention as an insert.

With reference now to the accompanying drawings, the thermostat valve of the present invention comprises a thermostatic operating element 10, having a housing 11 made of metal, for example brass. This housing 11 is a rotatory element. The housing 11 contains an expansion material, for example a wax mixture which changes its state of the matter, and thereby undergoes a considerable change of volume, at a predetermined temperature which can be set by means of the mixture of the wax. The interior of the housing 11 filled with the expansion material is sealed against the exterior by means of a bag-like diaphragm, into which a work piston 12 is inserted.

An electrical heating element, such as known from German Patent Publication DE-A 44 44 685 or DE-A 195 01 140, for example, is arranged in the housing 11 in the area of the expansion material. Electrical supply lines lead to this electrical heating element through the front face of the housing 11 located opposite the work piston 12.

When the expansion material contained in the housing 11 expands, the work piston 12 is pushed outwardly, while the housing 11 remains stationary. In the course of moving outwardly, the work piston 12 carries along a valve element 13, which surrounds the housing 11 of the operating element 10 in a cage-like manner (see FIG. 3 for depiction of the full cage-like configuration of the valve element 13; the valve element 13 is shown partially broken away in FIG. 1). In its area facing away from the work piston 12, the valve element 13 has a flange 14 in the form of a valve plate, which is provided with a seal ring 15 in the area of its outer edge. A valve seat 16, which represents a circumferential ring and is a part of a base plate 17, is associated with this plate-like valve flange 14.

A cylindrical neck 18 adjoins the interior of the plate-like valve flange 14 of the valve element 13 and acts to seal the valve element against the housing 11 of the thermostatic operating element 10. The housing 11 is provided with an annular shoulder 19, into which an annular groove 20 is cut, which receives a seal ring 21.

Figure 2:
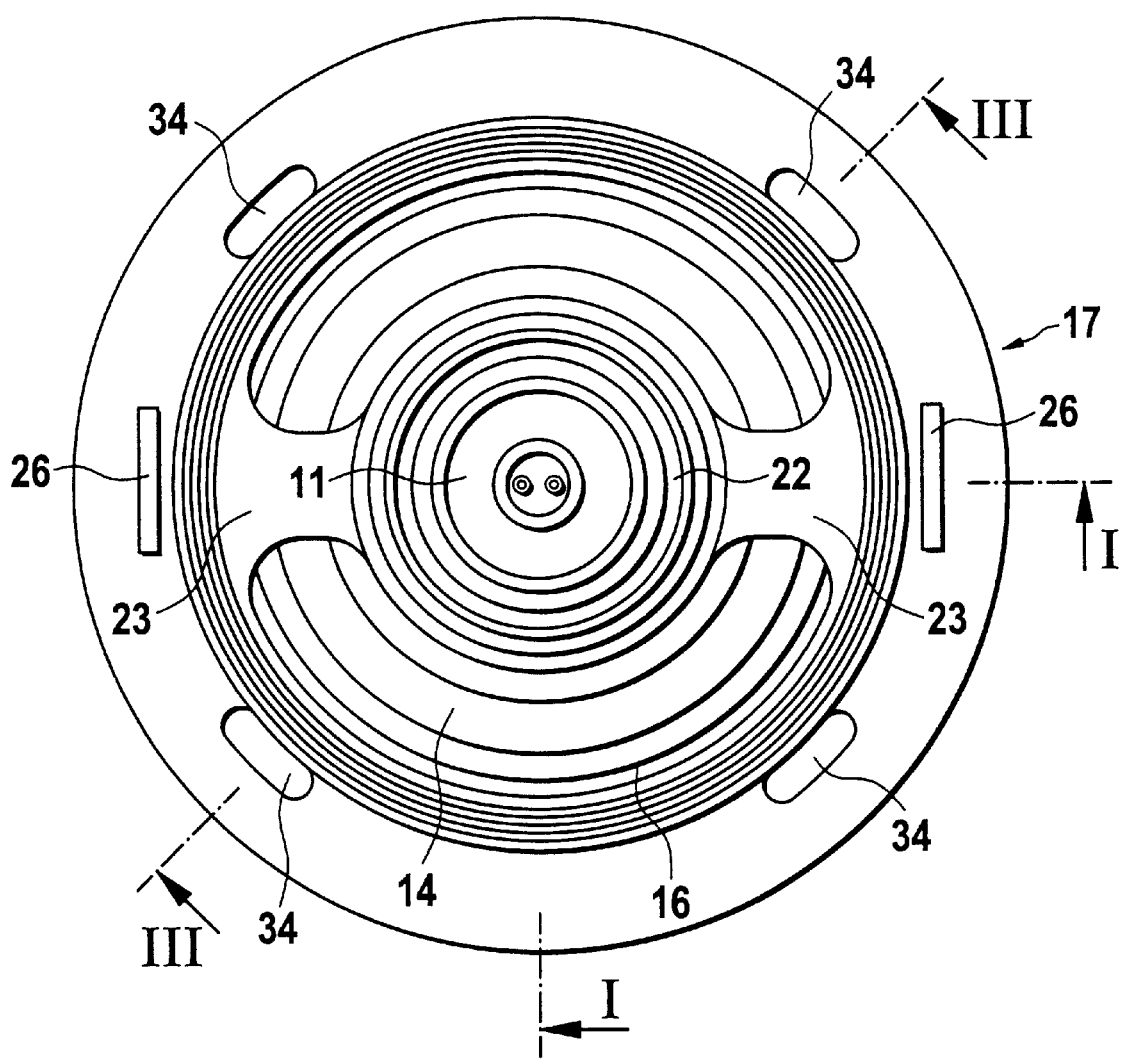
FIG. 2 is a plan view of the thermostat valve of FIG. 1 from the direction of the arrow II in FIG. 1.

The base plate 17 is provided with an inner collar 22 which is connected by means of strips 23 to the area of the valve seat 16 of the base plate 17, but leaves a relatively large flow cross section, as shown in FIG. 2. The collar 22, whose inner edge is beaded, is supported on the annular shoulder 19 of the housing 11 at the side facing away from the work piston 12.

In an advantageous manner the collar 22, and therefore also the base plate 17, is fixed in place on the housing 11 in the other direction, for example by means of a weld or a bead or the like.

In the area of the plate-like valve flange 14, the valve element 13 is loaded by a restoring spring 24, which is supported on an abutment 25. The abutment 25 is provided with legs 26, which are fastened on the base plate 17, for example by welding to the base plate 17. In place of welding, it is of course also possible to provide other interlocking connections, such as known from the prior art.

If the work piston 12 is extended out of the housing 11 of the thermostatic operating element 10 because of an increase of the volume of the expansion material, the work piston 12 takes the valve element 13 along against the effect of the restoring spring 24. The support forces required for the housing 11 in the course of this movement are absorbed by the collar 22 of the base plate 17, which is supported on the annular shoulder 19 of the housing 11. The forces from the restoring spring 24 are also introduced into the base plate 17 from the abutment 25 via the legs 26, so that all actuating forces are absorbed inside the described component and are not transferred to a housing or the like. The base plate 17, the valve element 13 and the abutment 25 with the legs 26 are made of metal, so that large forces can be absorbed. Therefore, there is relatively great freedom for the structural design of a housing receiving the thermostat valve, as well as for the material to be used for the housing.

Figure 3:
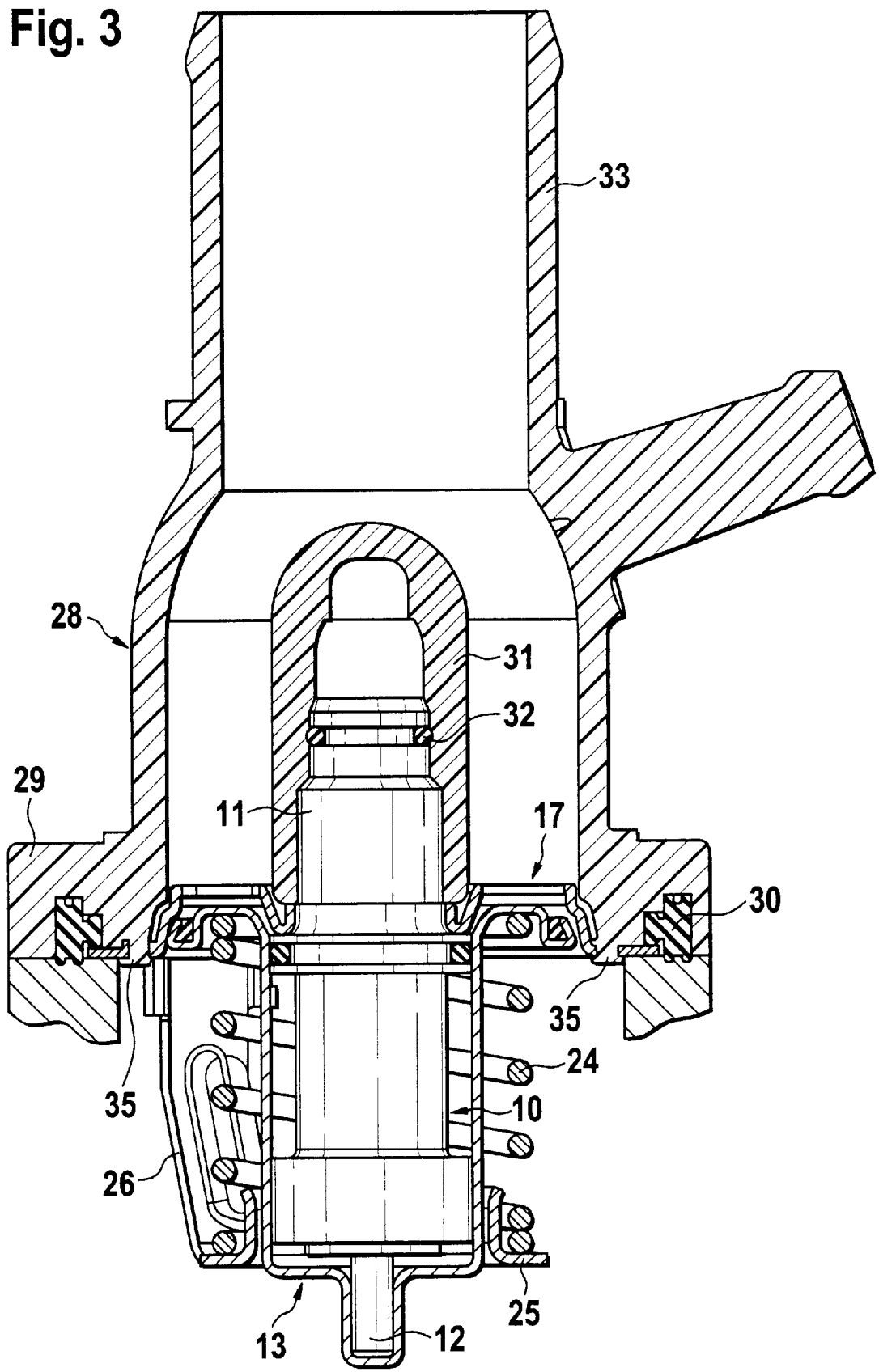
FIG. 3 is another sectional view of the thermostat valve of FIGS. 1 and 2 taken along the line III—III in FIG. 2 with a housing element receiving the thermostat valve.

With the exemplary embodiment in accordance with FIG. 3, the thermostat valve explained by means of FIGS. 1 and 2 has been combined with a cover-like housing element 28 of plastic into one assembly. The housing element 28 is provided with a flange 29, by means of which it is connected to another component, for example an engine block of an internal combustion engine. Here, the base plate 17, which has a circumferential edge, is clamped between these two elements. A circumferential seal ring 30 has been placed into the flange 29, which has a section resting against the base plate 17 and against the other component. This seal ring 30 therefore has a dual sealing function.

The housing element 28 has a cap-like guide 31 on the interior, into which the end of the housing 11 of the thermostatic operating element 10 facing away from the work piston 12 is inserted. The interior of the cap-like guide 31 is sealed against the area containing coolant by means of a seal ring 32 inserted into an annular groove of the housing 11.

The cap-like guide 31 is connected with the exterior of the housing element 28 by means of at least one strip, which leaves a sufficiently large flow cross section towards a hose connector 33. The electrical supply lines for the heating element of the thermostatic operating element 10 are conducted from the outside through the strip, in a manner not represented in detail, to the housing 11 of the thermostatic operating element 10.

Furthermore, the housing element 29 is also connected with the base plate 17. In the area of its circumferential edge, the base plate 17 is provided with several cutouts 34, which are also visible in FIG. 2. Shoulders 35 of the housing element 28 protrude through these cutouts, which are either designed as clip connectors, or which have been reshaped in a rivet-like manner by heating.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. A thermostat valve for a coolant circuit of an internal combustion engine, the thermostat valve comprising a stationary housing containing an electrically heatable thermostatic operating element, a work piston arranged for extension and retraction relative to the housing in response to the thermostatic operating element, a valve element forming a cage-like surrounding to the housing and having a plate-like valve seating flange sealed with respect to the housing and extending outwardly therefrom, the valve element being connected with the work piston for movement with the extension and retraction thereof, a base plate fixed to the housing and supporting a fixed abutment in spaced facing relation to the plate-like flange of the valve element, and a restoring spring disposed between the abutment of the base plate and the plate-like flange of the valve element for loading the valve element.

2. The thermostat valve in accordance with claim 1, characterized in that the base plate forms a valve seat for receiving the plate-like flange of the valve element.

3. The thermostat valve in accordance with claim 1, characterized in that the abutment includes at least two legs by which the abutment is fixed to the base plate.

4. The thermostat valve in accordance with claim 1, characterized in that the base plate includes an inner collar affixed to the housing and connected by strips to a valve seat portion of the base plate.

5. The thermostat valve in accordance with claim 1, characterized in that the housing has an annular shoulder which receives a seal ring and the valve element contacts the seal ring via a neck of the valve element adjoining the plate-like flange.

6. The thermostat valve in accordance with claim 5, characterized in that an inner collar of the base plate is supported on the annular shoulder of the housing.

7. The thermostat valve in accordance with claim 1, characterized further by a housing element having at least one connector for the coolant circuit and with a lead for electrical lines, the base plate being fastened on the housing element.

8. The thermostat valve in accordance with claim 7, characterized in that the housing element includes a cap-like guide which receives an end of the housing facing away from the work piston.

* * * * *